United States Patent
Valdez et al.

(10) Patent No.: US 9,870,206 B2
(45) Date of Patent: Jan. 16, 2018

(54) REPLICATION STRUCTURE IN A GRAPHICAL PROGRAMMING LANGUAGE

(71) Applicant: NATIONAL INSTRUMENTS CORPORATION, Austin, TX (US)

(72) Inventors: Julian G. Valdez, Austin, TX (US); Taylor L. Riche, Austin, TX (US); Neil S. Feiereisel, Cedar Park, TX (US); Robert E. Dye, Austin, TX (US); Stephen R. Loftus-Mercer, Austin, TX (US); Dustyn K. Blasig, Pflugerville, TX (US); Mary E. Fletcher, Austin, TX (US); Brent C. Schwan, Austin, TX (US); Stephen L. Dark, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 14/937,732

(22) Filed: Nov. 10, 2015

(65) Prior Publication Data
US 2017/0131976 A1 May 11, 2017

(51) Int. Cl.
*G06F 9/44* (2006.01)
*G06F 9/45* (2006.01)

(52) U.S. Cl.
CPC ............... *G06F 8/34* (2013.01); *G06F 8/36* (2013.01); *G06F 8/41* (2013.01)

(58) Field of Classification Search
CPC ............... G06F 8/34; G06F 8/36; G06F 8/41
See application file for complete search history.

(56) References Cited

U.S. PATENT DOCUMENTS

| | | | |
|---|---|---|---|
| 5,546,519 A | 8/1996 | Berry | |
| 7,120,877 B2 | 10/2006 | Gabbert | |
| 7,210,105 B2 | 4/2007 | Melamed | |
| 7,574,690 B2 | 8/2009 | Shah | |
| 2003/0037327 A1* | 2/2003 | Cicciarelli | G06F 8/61 717/178 |
| 2006/0036799 A1* | 2/2006 | Shah | G06F 8/38 711/100 |
| 2006/0174238 A1* | 8/2006 | Henseler | G06F 8/63 717/168 |
| 2007/0177180 A1* | 8/2007 | Yamada | H04N 1/00931 358/1.13 |
| 2008/0058969 A1* | 3/2008 | Nixon | G05B 19/0426 700/87 |
| 2008/0126956 A1* | 5/2008 | Kodosky | G06F 8/34 715/763 |

(Continued)

*Primary Examiner* — Chameli Das
(74) *Attorney, Agent, or Firm* — Meyertons Hood Kivlin Kowert & Goetzel, P.C.; Jeffrey C. Hood; Mark S. Williams

(57) ABSTRACT

System and method for creating a graphical program. A first replication structure may be included in a graphical program, where the first replication structure specifies replication of any graphical program code inside the first replication structure. First graphical program code may be included inside the first replication structure. An implementation of the graphical program may be automatically generated, including generating multiple instances of an implementation of the first graphical program code within the implementation of the graphical program. Executing the graphical program may include executing the multiple instances, e.g., concurrently and/or serially.

25 Claims, 19 Drawing Sheets

(56) References Cited

U.S. PATENT DOCUMENTS

| | | | | |
|---|---|---|---|---|
| 2008/0263516 A1* | 10/2008 | Hartadinata | ............... | G06F 8/34 |
| | | | | 717/109 |
| 2009/0049424 A1* | 2/2009 | Kumar | ...................... | G06F 8/34 |
| | | | | 717/109 |
| 2010/0031231 A1* | 2/2010 | Ilic | ...................... | G06F 11/3664 |
| | | | | 717/105 |
| 2011/0010688 A1* | 1/2011 | Hogg | ......................... | G06F 8/34 |
| | | | | 717/105 |
| 2013/0031494 A1* | 1/2013 | Kumar | ...................... | G06F 8/34 |
| | | | | 715/763 |
| 2013/0127709 A1* | 5/2013 | Spielberg | ............ | G06F 3/04847 |
| | | | | 345/157 |
| 2013/0226535 A1* | 8/2013 | Tuan | ................... | G06F 17/5036 |
| | | | | 703/2 |
| 2013/0339923 A1* | 12/2013 | Xu | ........................... | G06F 8/433 |
| | | | | 717/104 |
| 2016/0062799 A1* | 3/2016 | Stanfill | ................. | G06F 9/4881 |
| | | | | 718/102 |

* cited by examiner

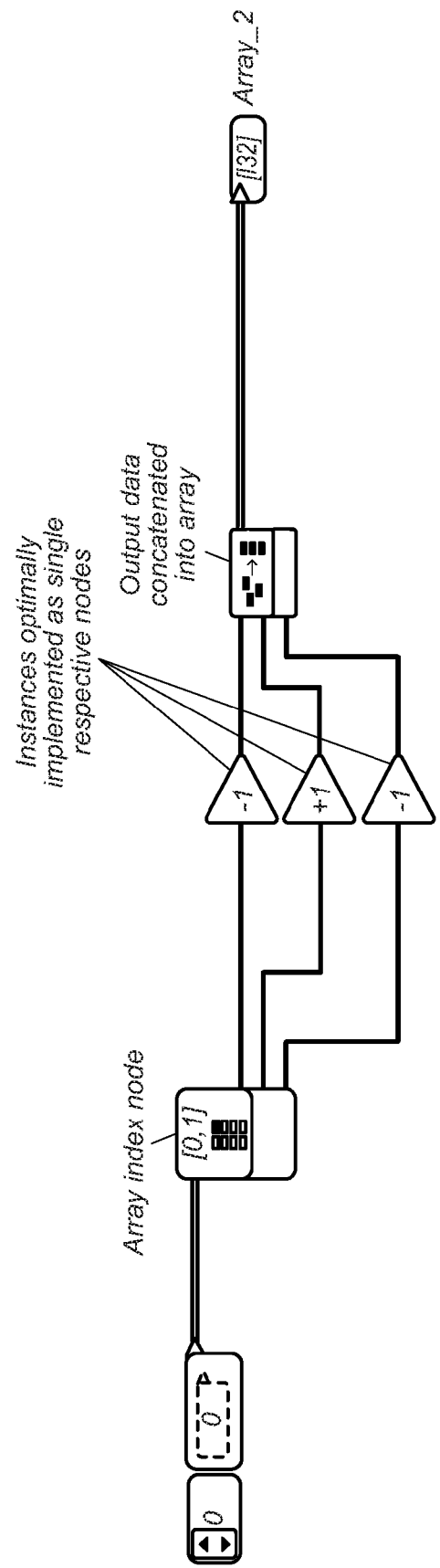

REPLICATION STRUCTURE IN A GRAPHICAL PROGRAMMING LANGUAGE

FIELD OF THE INVENTION

The present invention relates to the field of graphical programming, and more particularly to a replication structure in a graphical programming language.

DESCRIPTION OF THE RELATED ART

Graphical programming has become a powerful tool available to programmers. Graphical programming environments such as the National Instruments LabVIEW™ product have become very popular. Tools such as LabVIEW™ have greatly increased the productivity of programmers, and increasing numbers of programmers are using graphical programming environments to develop their software applications. In particular, graphical programming tools are being used for test and measurement, data acquisition, process control, human machine interface (HMI), supervisory control and data acquisition (SCADA) applications, modeling, simulation, image processing/machine vision applications, and motion control, among others.

In many applications, one or more channels of acquired data are processed by the same algorithm. For example, within a given program, a collection, e.g., an array, may be used to store multiple values obtained from a single stream of data, e.g., the samples may have been obtained over a period of time from a single analog input. Such programs may be classified as "single channel" applications.

Alternatively, a collection, e.g., an array, may be used to store values obtained from multiple streams of data. An example of this is an collection where the value at each index was obtained from a different analog input. In this case, in each subsequent execution of the program (or algorithm), the values at each index may represent subsequent samples from the same set of inputs and are typically arranged in the same order. Such programs may be classified as "multichannel" applications.

In a single channel application, the programmer may employ a loop to process the samples iteratively, and the code within that loop may record state information that is updated upon processing of each sample, and that influences the processing of subsequent samples. In this usage, the loop provides a succinct representation of the intent to apply an identical algorithm to all samples in the collection, and to carry over any state information in that algorithm from the processing of one sample to another. Further, this representation is generic with respect to the number of samples to be processed.

Similarly, in multi-channel applications, a programmer may wish to apply a single algorithm to all of the samples, but with the need to maintain independent state for each channel. A loop cannot be employed in this case due to the loop's implicit sharing of state between executions of the code. In this case, the programmer must resort to an alternative, e.g., manually duplicating the code a number of times equal to the expected number of samples, which may be tedious and error prone.

SUMMARY OF THE INVENTION

Various embodiments of a replication structure in a graphical program language and its use are presented below. One or more functional units may perform embodiments of the following techniques, i.e., may perform a method accordance with the techniques disclosed herein.

A first replication structure may be included in a graphical program, where the first replication structure specifies replication of any graphical program code inside the first replication structure. First graphical program code may be included inside the first replication structure.

An implementation of the graphical program may be automatically generated, including generating multiple instances of an implementation of the first graphical program code within the implementation of the graphical program. Accordingly, executing the graphical program may include executing the multiple instances. In other words, the method may include executing the graphical program, including executing the multiple instances. In one embodiment, at least two of the multiple instances may be executed concurrently. In some embodiments, at least two of the multiple instances may be executed serially.

Generating an implementation of the graphical program may include compiling the graphical program, and generating the multiple instances may be performed during this compiling. In one embodiment, generating an implementation of the graphical program may include generating an intermediate representation of the graphical program, and generating the multiple instances may be performed during or as part of the generation of the intermediate representation.

Alternatively, in one embodiment, generating the multiple instances may be performed at runtime. Moreover, in further embodiments, some of the instances may be generated at compile time, and others of the instances may be generated at runtime.

In one embodiment, the first graphical program code may include at least one second replication structure that specifies replication of any graphical program code inside the second replication structure. In other words, replication structures may be nested (to any degree desired). Thus, some replication structures may specify replication of one or more other replication structures, and so forth, with commensurate proliferation of instances. In various embodiments, the first graphical program code may include code that causes side effects, and/or code that maintains state information between executions.

The implementation of the first graphical program code may include one or more of: original graphical source code, an intermediate representation, or executable code.

The first replication structure may be configured to receive at least one collection, such as an array, as input, where the number of generated instances may be determined based on the size of the at least one collection. The first replication structure may be configured to implicitly disaggregate collection inputs into scalars and distribute the scalars to respective instances of the multiple instances. Similarly, the first replication structure may be configured to implicitly aggregate scalar outputs into collections.

The first replication structure may be configured to receive at least one variable as input, and distribute the at least one variable to each of the instances.

In some embodiments, the first replication structure may include an instance count terminal configured to receive an input value, and the number of generated instances may be determined based on the input value. In one embodiment, the number of generated instances is compile time static, while in other embodiments, the number of generated instances is runtime dynamic.

The first replication structure may include an instance identifier variable that is usable by each implementation of the first graphical program code to identify its respective instance. The first replication structure may be further configured to provide inter-instance communication, where at least two of the instances are chained, e.g., serially. More generally, the first replication structure may be configured to provide inter-instance communication for the instances, where the multiple instances have a connection topology that includes one or more of: a ring topology, a line topology, a star topology, a tree topology, a bus topology, a mesh topology, or a fully connected topology, as desired. In various embodiments, this connection topology may be determined at compile time, or at runtime.

In some embodiments, the first replication structure may be further configured to specify a runtime debug annotation indicating which instance is currently executing, in which case executing the graphical program may include displaying an indication of which instance is currently executing.

In some embodiments, the number of instances to generate may be specified, e.g., implicitly or explicitly, e.g., by a user, or a user application. Note, however, that the number of instances specified, e.g., by the user application, may differ from the number of instances actually generated by the compiler, runtime, or any other interpretation or execution of the application. Thus, for example, given an application specification of N instances, the compiler (or runtime process) may choose to generate M instances, where M is less or greater than N. In various embodiments, instances may be generated, cached, stored, loaded, or deleted as necessary at any stage of compilation or execution. Said another way, the method may include specifying a number N of instances to generate, wherein N is a positive integer. Accordingly, generating multiple instances of an implementation of the first graphical program code may include generating M instances, wherein M is a positive integer that is different from N. Executing the multiple instances may include executing the M instances, including managing state information, such that said executing the M instances functionally implements execution of the specified N instances.

Thus, in some embodiments, the number of instances specified may not be the same as the number of instances actually generated. As a specific example, in one exemplary embodiment, a number N of instances to generate may be specified, where N is a positive integer, and generating multiple instances of an implementation of the first graphical program code may include generating M instances (instead of N), where M is a positive integer that is less than N. Executing the multiple instances may then include time multiplexing execution of the M instances, including managing state information, such that said time multiplexing execution of the M instances functionally implements execution of the specified N instances. In other words, one or more of the instances may be time-shared, thereby providing the functionality of a greater number of instances.

BRIEF DESCRIPTION OF THE DRAWINGS

A better understanding of the present invention can be obtained when the following detailed description of the preferred embodiment is considered in conjunction with the following drawings, in which:

FIG. 11B illustrates an exemplary optimized implementation of the instances generated from the replication structure of FIG. 11A, according to one embodiment.

Figure 1A:
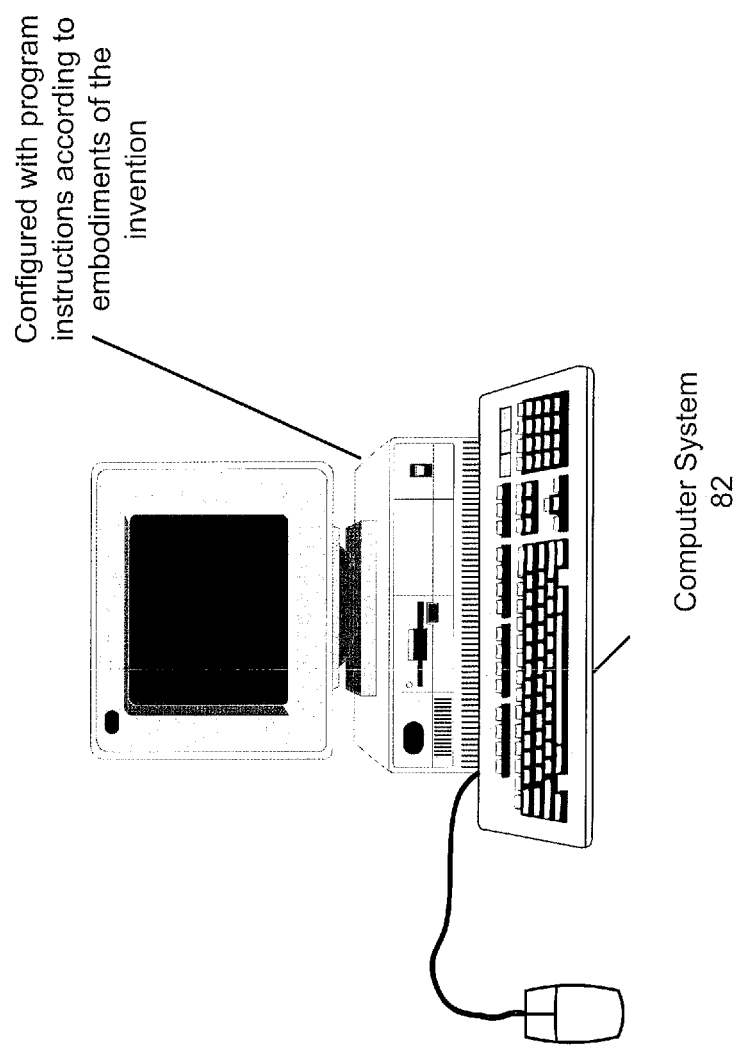
FIG. 1A illustrates a computer system configured to create and execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW™ VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Proximate—near to; For example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized", "globally optimum", and "globally optimal" mean "globally improved with respect to specified criteria". One example of a global optimization method is differential evolution, which optimizes a problem (system or process) via iterative improvement of candidate solutions with respect to some specified measure of quality.

Side effect—refers to an observable or detectable change made or caused by a code portion outside its scope. Examples of common side effects include changing the state of variables owned by outer scopes or at a global scope, reading and writing data to files, passing data to other processes, temporal control of code portion, throwing errors or exceptions, allocating and deallocating memory, and reading and writing IO, among others. Optimizing code with side effects is difficult since the compiler must ensure the program will operate in a manner that maintains the same observable behavior as the original application.

FIG. 1A—Computer System

FIG. 1A illustrates a computer system 82 configured to create and/or execute a graphical program configured according to embodiments of the present techniques. Embodiments of a replication structure in a graphical program and method of use are described below.

As shown in FIG. 1A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include a functional unit, and at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs in accordance with the techniques disclosed herein. The memory medium may also store operating system software, as well as other software for operation of the computer system. Various embodiments further include receiving or storing instructions and/or data implemented in accordance with the foregoing description upon a carrier medium.

Figure 1B:
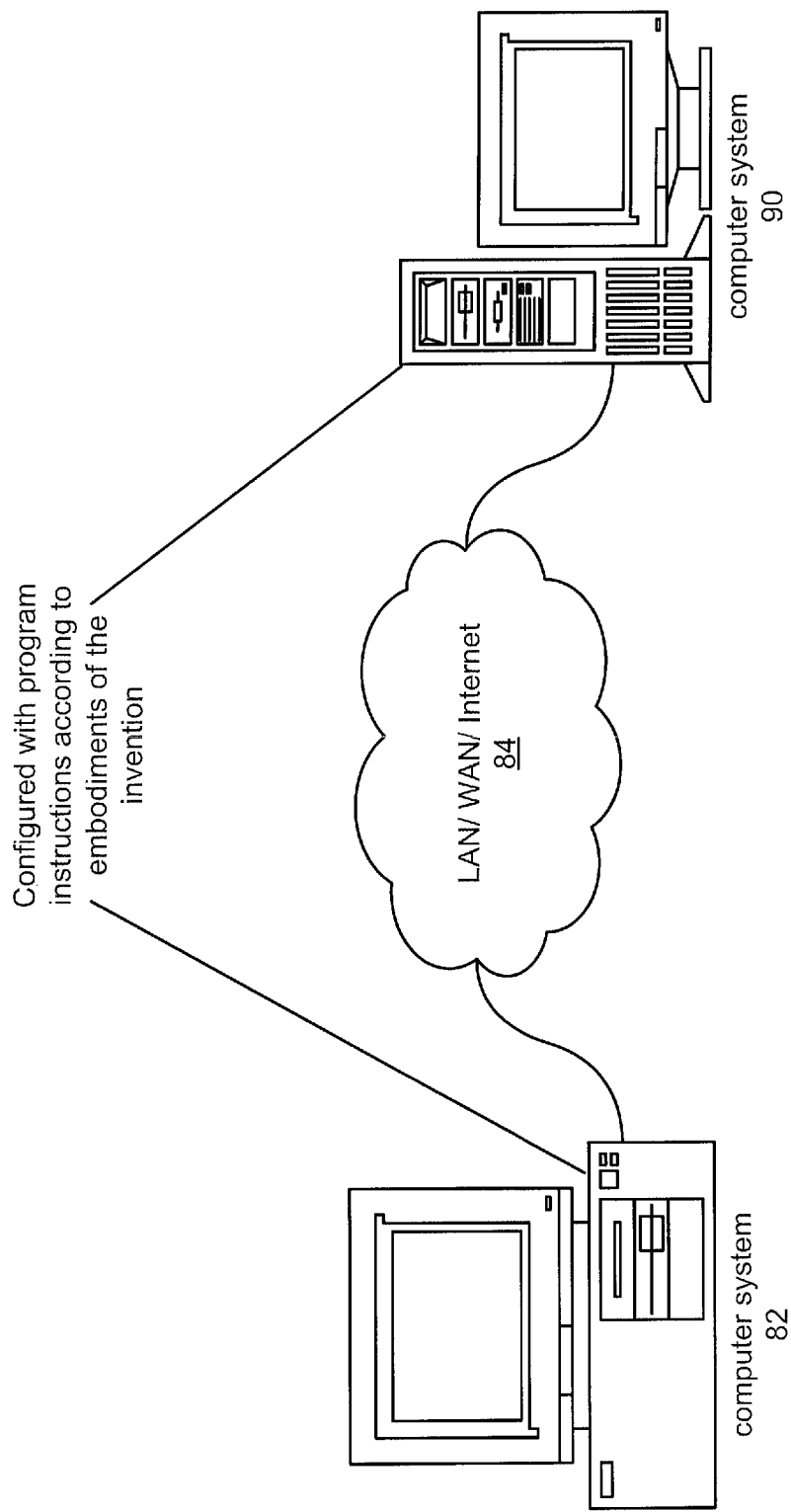
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

More generally, embodiments of the replication structure described herein may be implemented in, on, or by any type of hardware desired, e.g., one or more CPUs (central processing units), GPU's (graphics processing units), FPGAs (field programmable gate arrays), separate computers on a network, cloud based systems, ASICs (application specific integrated circuits), and so forth.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
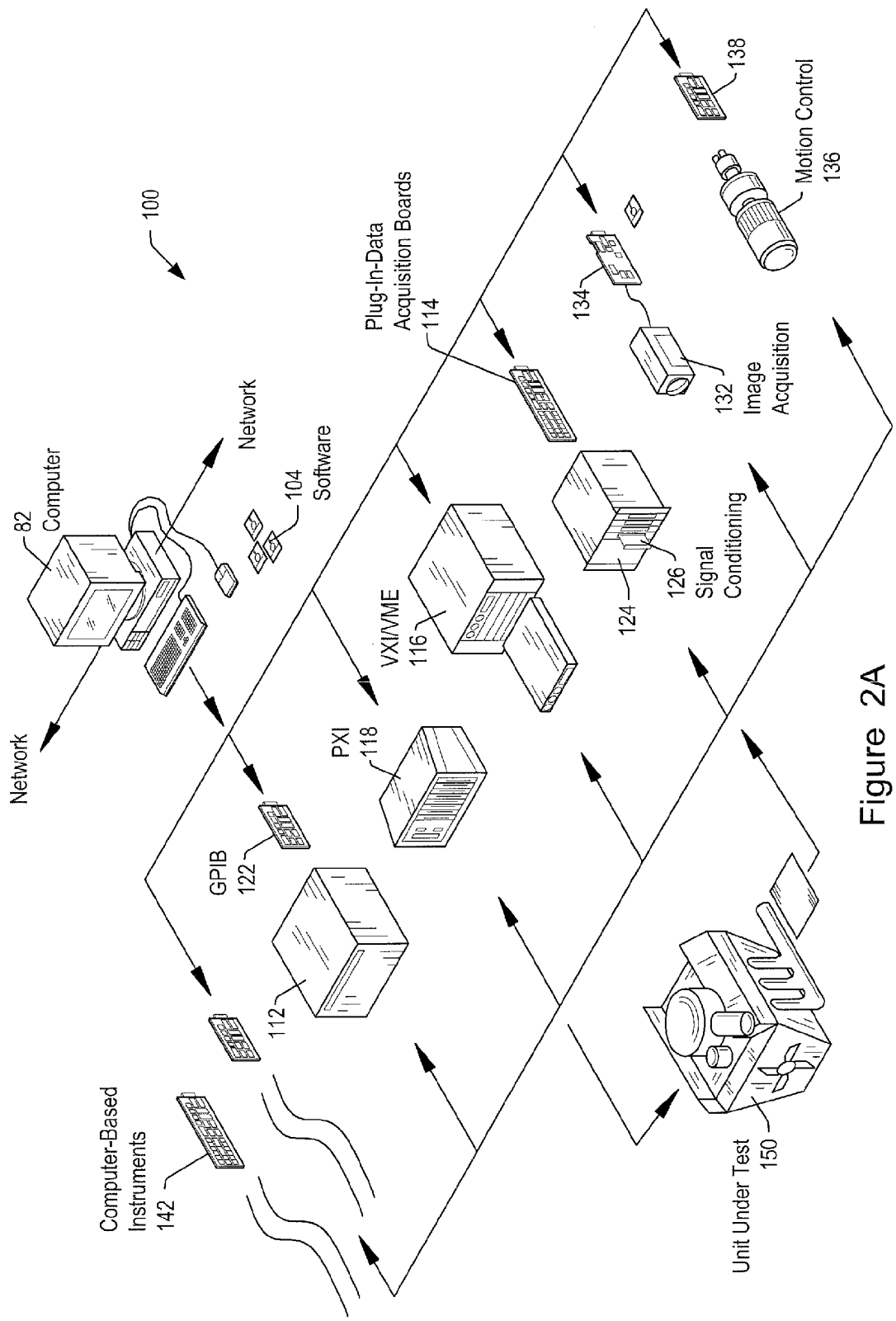
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU (or more generally, a functional unit), a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
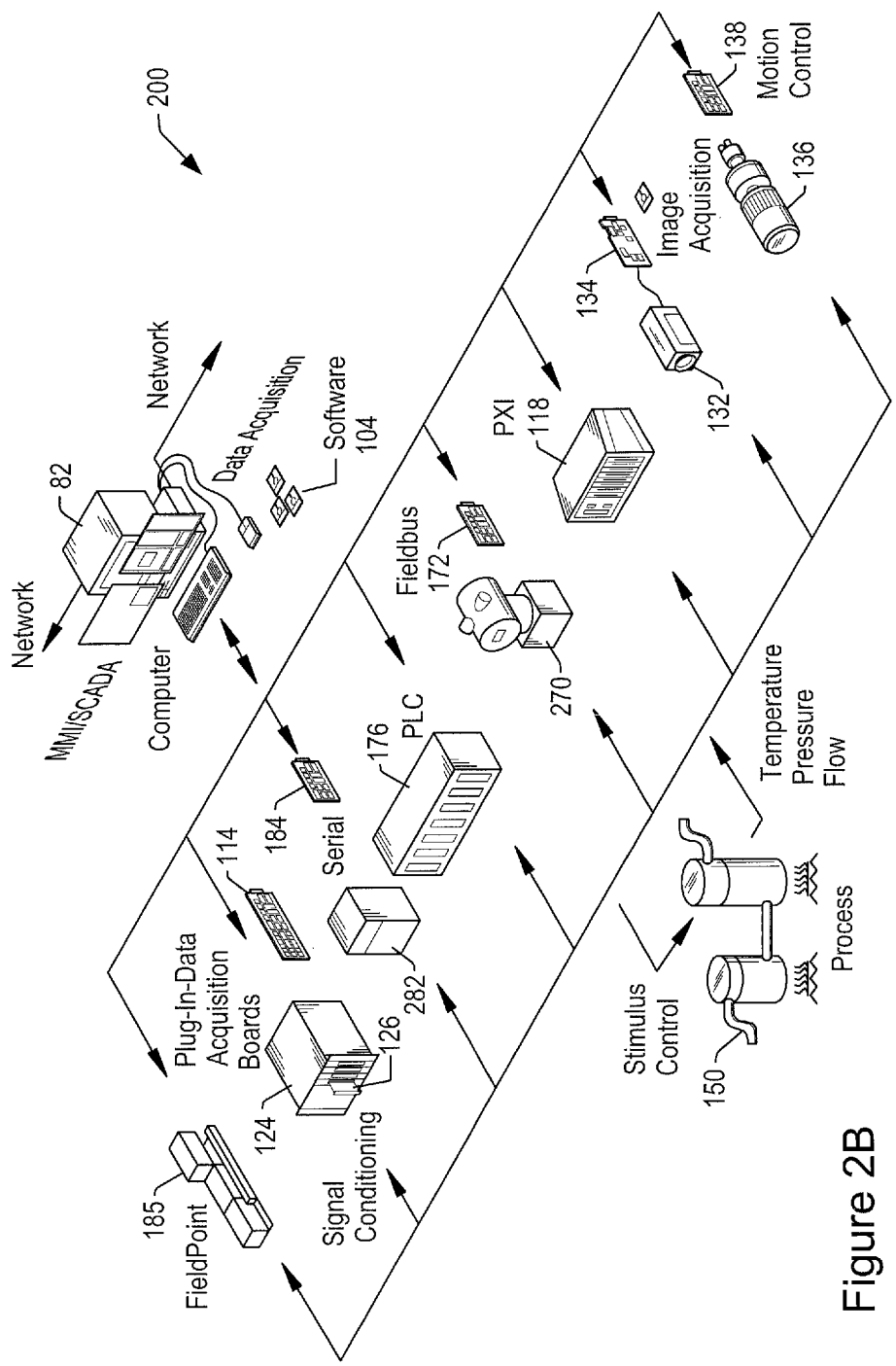
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU (or more generally, a functional unit), a display screen, memory, and one or more input devices such as a mouse or keyboard as shown. The computer 82 may operate with the one or more devices to perform an automation function with respect to a process or device 150, such as HMI (Human Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 3A:
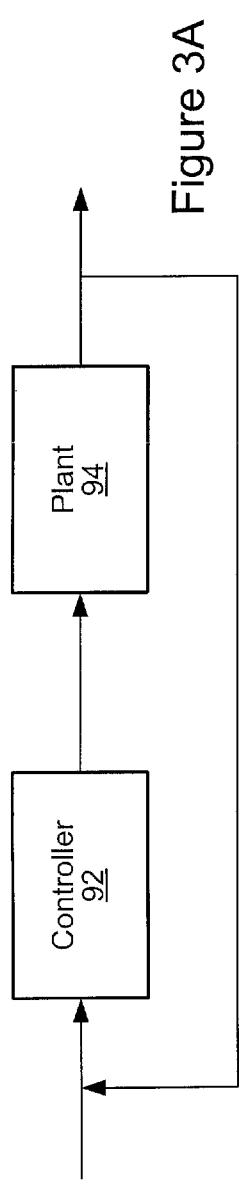
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
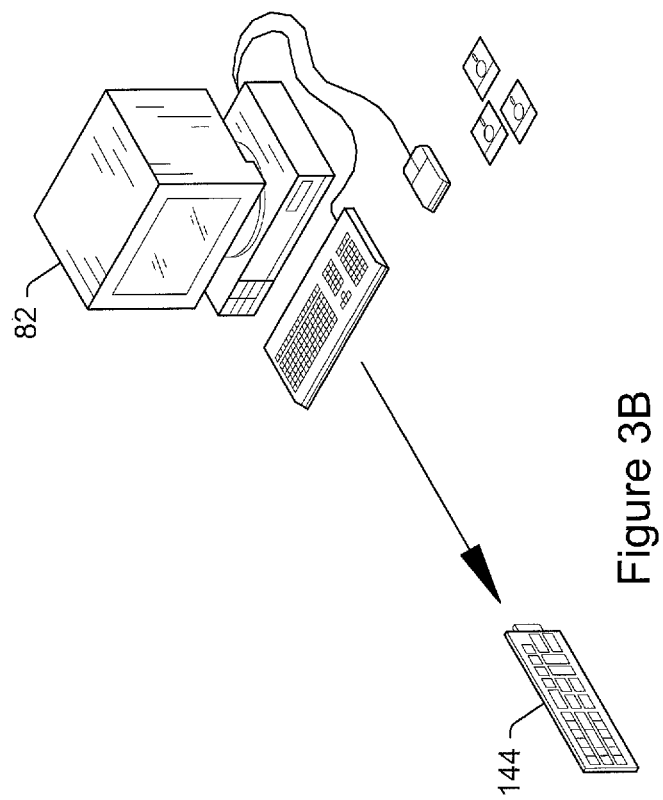
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
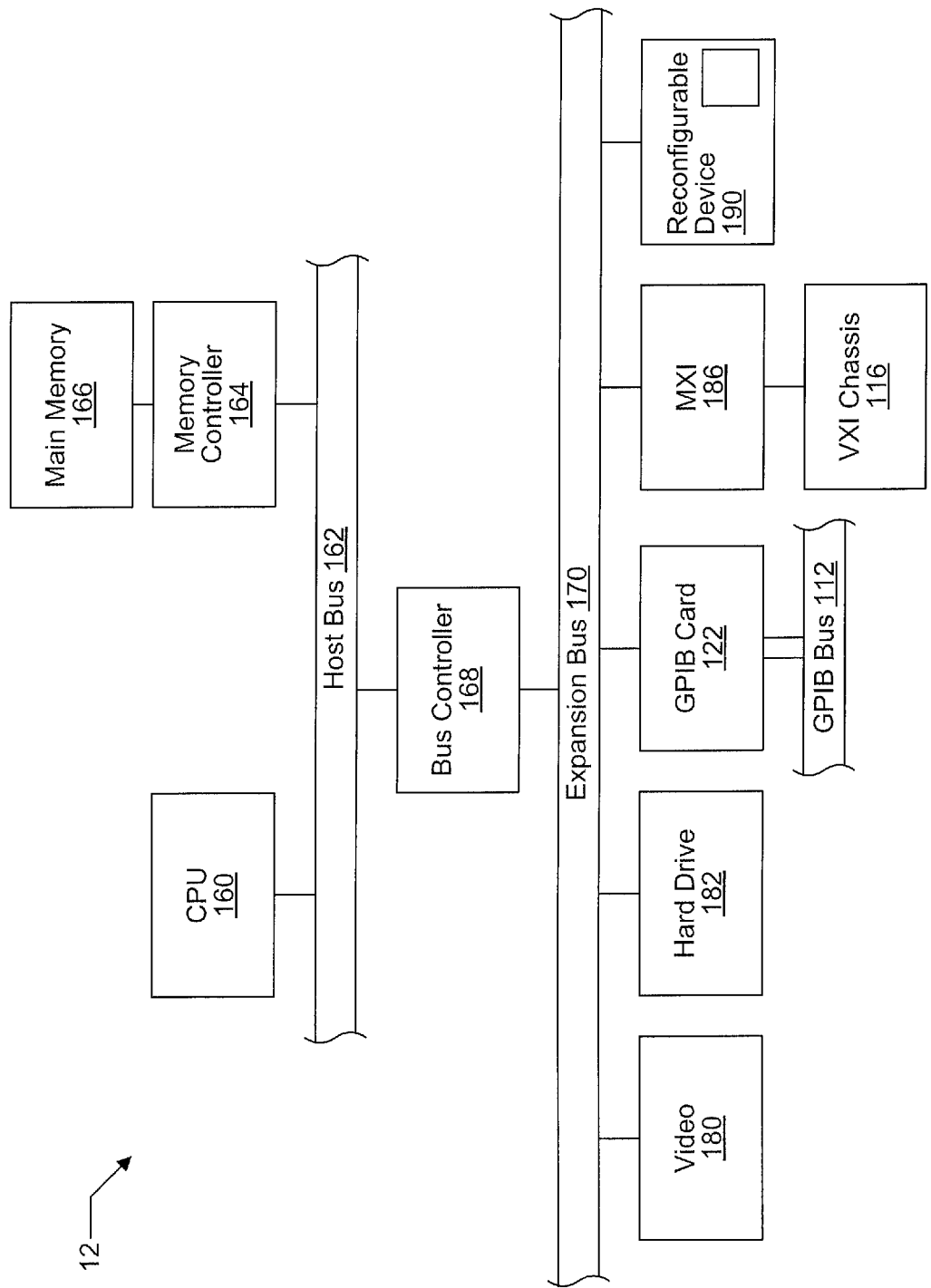
FIG. 4 is an exemplary block diagram of the computer systems of FIGS. 1A, 1B, 2A and 2B and 3B.

FIG. 4—Computer System Block Diagram

FIG. 4 is a block diagram 12 representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. Additionally, or alternatively, in some embodiments, the computer may include a functional unit. A memory medium, typically comprising RAM and referred to as main memory, 166 is coupled to the host bus 162 by means of memory controller 164. The main memory 166 may store a graphical program development environment, such as LabVIEW™ provided by National Instruments Corporation, as well as a graphical program configured per the techniques disclosed herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Overview: Replication Structure

Embodiments of the replicate structure disclosed herein may eliminate the need for manual duplication/replication of program code, e.g., any graphical program code, providing a succinct representation of the intent to apply an identical algorithm to all samples (elements) in the collection while maintaining independent state information for the processing of each sample (element). Moreover, this representation may be generic with respect to the number of samples (elements) to be processed.

A detailed description of embodiments of the replication structure and its use are now presented.

Figure 5:
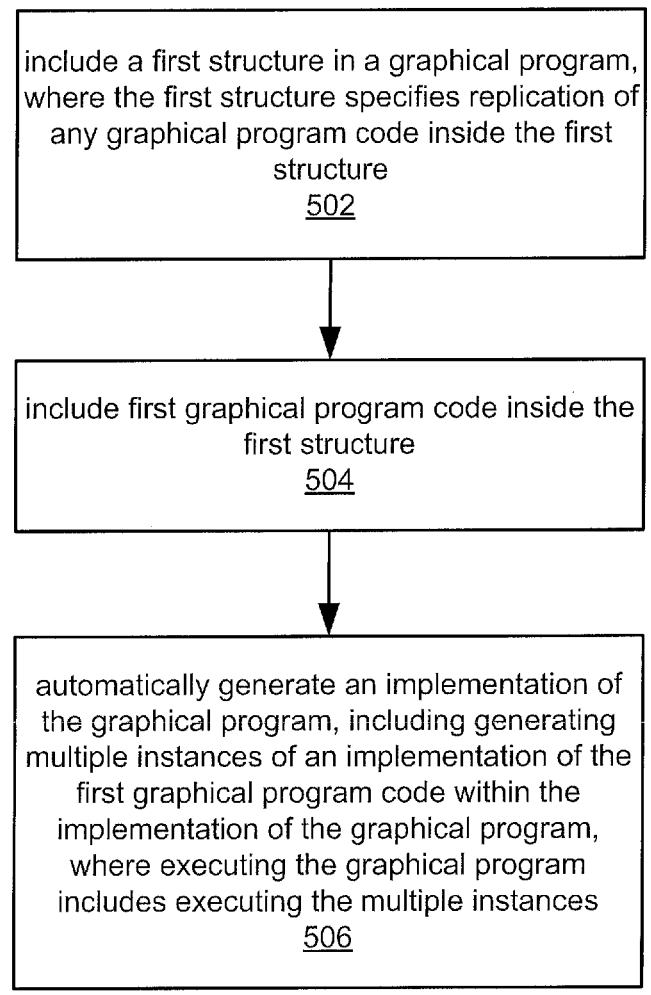
FIG. 5 is a flowchart diagram illustrating one embodiment of a method for creating a graphical program using a replication structure.

FIG. 5—Method for Creating a Graphical Program Using a Replication Structure

FIG. 5 illustrates a method for creating a graphical program, according to one embodiment. More specifically, FIG. 5 is a flowchart of a method for creating a graphical program using a replication structure. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, a first replication structure may be included in a graphical program. The first replication structure may specify replication of any graphical program code inside the first replication structure. In some embodiments, the graphical program may include a plurality of interconnected nodes or icons that visually indicate functionality of the program. The interconnected nodes or icons may thus be graphical source code for the program. Graphical function nodes may also be referred to as blocks, e.g., function blocks. In some embodiments, the graphical program may be a graphical data flow program.

In 504, first graphical program code may be included inside the first replication structure. For example, in one embodiment, the first replication structure may include an interior, e.g., defined by a border or boundary, and a user (developer) may drag and drop the first graphical program code into the interior of the first replication structure. In another embodiment, the user may assemble the first graphical program code in the interior of the first replication structure, e.g., dragging and dropping graphical program nodes into the interior, and interconnecting them via wires. The first graphical program code may include any of a variety of program elements and structures, including, but not limited to, variables of any data types supported by the programming language in which the program is developed, constants of any data types supported by the programming language, loops, conditional statements, sequence structures, functional code, and so forth. In some embodiments, the first graphical program code may even include one or more other replication structures.

In some embodiments, the first graphical program code may include code that causes side effects and/or code that maintains state information between executions. In other words, the first graphical program code may not be limited to code whose instances can be executed entirely independently, e.g., with no dependencies with respect to any of the other instances, but may include code that provides, uses, or even requires information or results to or from one instance execution and another, or even from other program portions.

In 506, an implementation of the graphical program may be automatically generated. In some embodiments, automatically generating the implementation of the graphical program may include generating multiple instances of an implementation of the first graphical program code within the implementation of the graphical program. In other words, an implementation of any graphical program code, e.g., the first graphical program code, that was included inside the first replication structure may be replicated, thereby generating multiple instances of the implementation of the first graphical program code. Executing the graphical program may include executing the multiple instances. Note that the automatic generation of the implementation of the graphical program may be performed at any of various points in the program development process. For example, in one embodiment, the generating an implementation of the graphical program includes compiling the graphical program, and the generating multiple instances is performed during the compiling. In various embodiments, the implementation of the first graphical program code may include one or more of original graphical source code, an intermediate representation, or executable code.

Thus, in some embodiments, generating an implementation of the graphical program may include generating an intermediate representation of the graphical program, e.g., a data flow intermediate representation (DFIR), as provided by the National Instruments Corporation, and generating the multiple instances may be performed during the generating the intermediate representation. Alternatively, in some embodiments, the generating multiple instances may be performed at runtime, i.e., during execution.

In some embodiments, the first replication structure may be configured to receive at least one variable as input, and distribute the at least one variable to each of the instances. In some embodiments, the first replication structure may be configured to receive at least one collection as input, and the number of generated instances may be determined based on the size of the at least one collection.

Figure 6A:
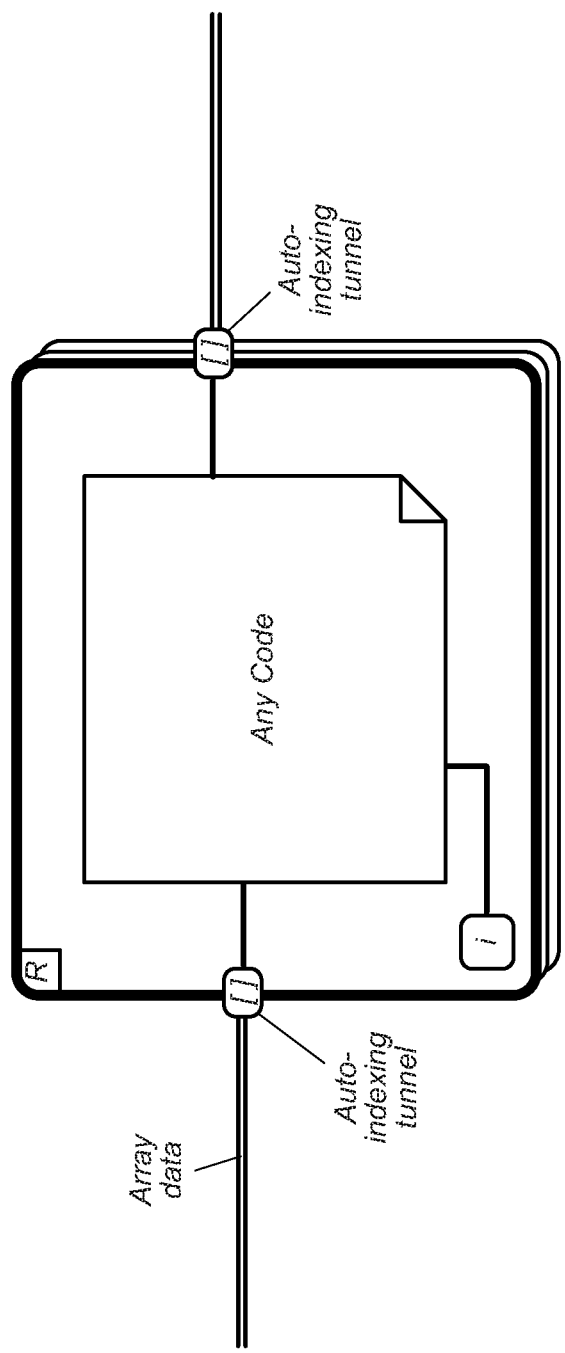
FIG. 6A illustrates an exemplary replication structure with instance (replica) count based on size of collection inputs, according to one embodiment.

FIG. 6A illustrates an exemplary replication structure, according to one embodiment. As may be seen, the exemplary replication structure includes graphical program code, here labeled "Any Code", in the interior of the replication structure, and indicates the structure's functionality via the label "R" (for replication) in the top left of the structure. As also shown, the exemplary replication structure of FIG. 6A is configured to receive array inputs, as indicated by the input wire entering the replication structure on the left side labeled "Array data". Note that another term for array is "vector". As FIG. 6A also shows, in one embodiment, the replication structure may include an auto-index tunnel whereby the size of the array may be passed to the replication structure, and which may be used to implicitly specify a number of instances of the graphical program code to generate. Accordingly, this particular embodiment of the replication structure includes an instance (replica) count based on the size of the array inputs, which is provided via the auto-index tunnel.

Figure 6B:
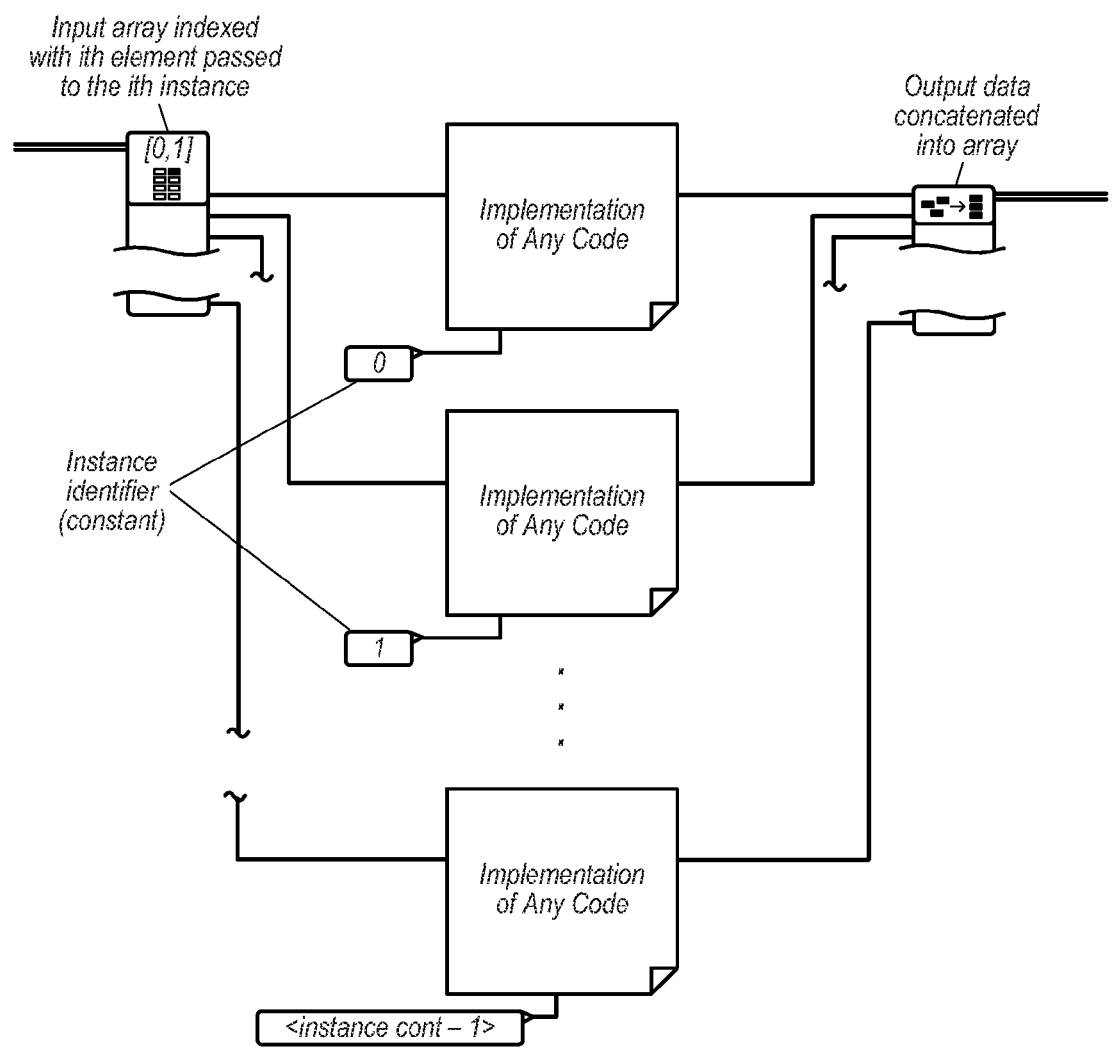
FIG. 6B illustrates an exemplary generated implementation of a graphical program corresponding to the replication structure of FIG. 6A, according to one embodiment.

FIG. 6B illustrates an exemplary generated implementation of a graphical program corresponding to the replication structure of FIG. 6A according to one embodiment. As shown, multiple instances of an implementation of the first graphical program code have been generated, e.g., in accordance with the auto-indexing of FIG. 6A. Note that in the exemplary embodiment shown, the implementation of the graphical program includes a node or element, e.g., an array index node, that is configured to provide or pass the $i^{th}$ array element to the $i^{th}$ instance of the implementation of the first graphical program code as input, i.e., the input array may be indexed such that the $i^{th}$ array element is passed to the $i^{th}$ instance of the implementation of the first graphical program code, as indicated. Accordingly, in some embodiments, the first replication structure may be configured to implicitly disaggregate array inputs into scalars and distribute the scalars to respective instances of the multiple instances. Similarly, as also shown in FIG. 6B, the implementation of the graphical program may include another node or element configured to aggregate output data from the multiple instances into an array. Said another way, the (e.g., first) replication structure may be configured to implicitly aggregate scalar outputs into arrays. These techniques apply broadly to any type of collection, these array embodiments being exemplary only.

Thus, in some embodiments, the number of instances of the implementation of the first graphical program code may be automatically determined based on the size of collection, e.g., array, inputs to the replication structure. Note, however, that in other embodiments, other ways to specify the instance count may be used as desired, e.g., explicitly, via input from the user, process, or file, or via automatic analysis of inputs, as discussed below in more detail. The number of instances may be referred to herein as "instance count", although any other name may be used as desired. Note that in the exemplary embodiment shown in FIG. 6B, each instance has a respective instance identifier (instance ID) indicating which instance it is, and that the last instance shown in FIG. 6B has the instance ID value of "instance count−1", due to zero-based array indexing/counting, where the array elements and instances are numbered 0 through (instance count−1). In embodiments where 1-based array indexing is used, the instance IDs may range from 1 to "instance count". Thus, more generally, the first replication structure may include an instance identifier variable that is usable by each implementation of the first graphical program code to identify its respective instance.

Accordingly, a collection of values may be (disaggregated and) distributed among the generated instances. As used herein the term "collection" is meant to include, but is not limited to, plural data types, such as arrays, lists, sets, and queues, among others. Such collections may be sources of data distribution and receivers of data aggregation. Collections may be sorted or unsorted; unsorted data sets may allow additional flexibility in the data distribution and collection. In other embodiments, the first replication structure may be configured to receive at least one variable as input, and may distribute the at least one variable to each of the instances. In other words, the same input data may be provided to each instance. One exemplary use for such replication of input data is to provide internal consistency or error checking for complex algorithms.

In some embodiments, the instance count may be specified explicitly. For example, the first replication structure may include an instance count terminal configured to receive an input value, and the number of generated instances may be determined based on the input value. The input value may be provided via user input, from another program node or element, from a process or program, a file, and so forth.

Figure 7A:
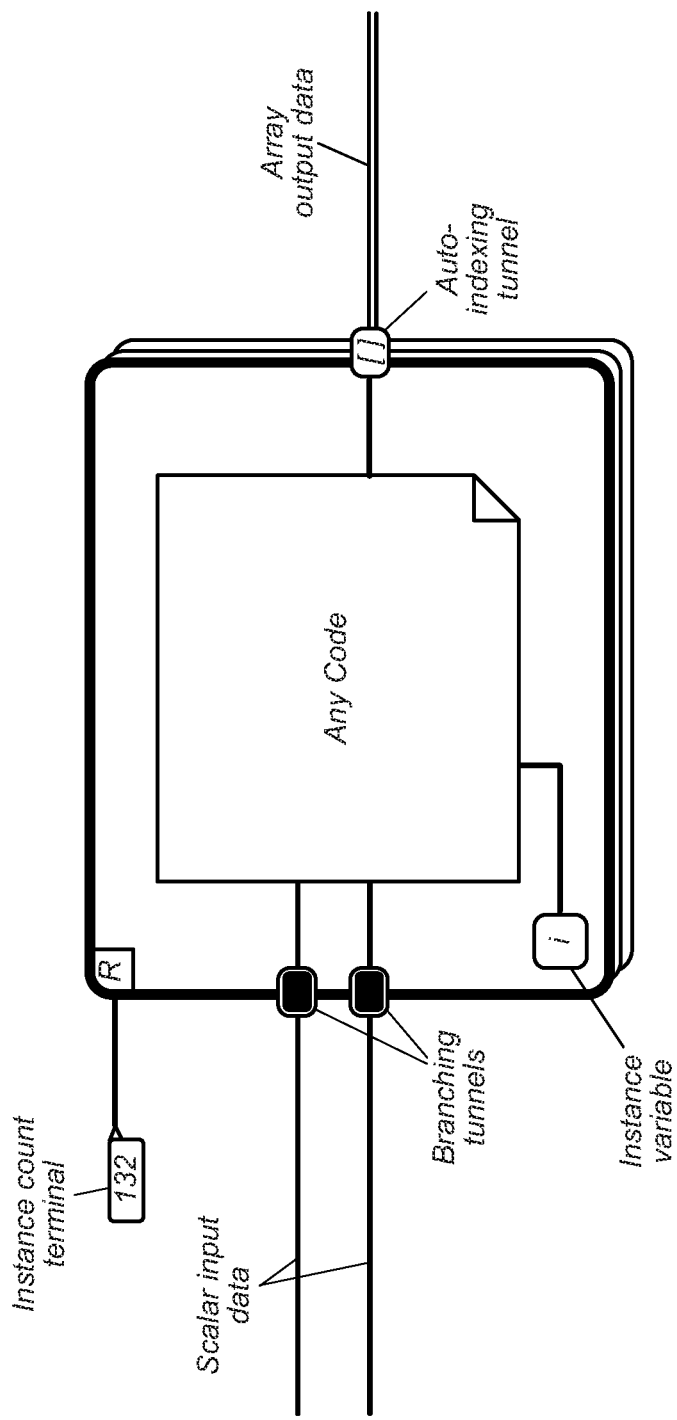
FIG. 7A illustrates an exemplary replication structure with explicit instance (replica) count, according to one embodiment.

FIG. 7A illustrates an exemplary replication structure with explicit instance (or replica) count, according to one embodiment. More specifically, the exemplary replication structure of FIG. 7A includes an instance count terminal configured to receive a 32 bit integer input value specifying the number of instances to generate. As also shown, the replication structure of FIG. 7A is configured to receive scalar input data via branching tunnels which may be utilized by the generated implementation of FIG. 7B to distribute input data to respective instances, as described below. The replication structure of FIG. 7A also includes an instance variable i, so labeled, which may be used in providing instance IDs to the generated multiple instances, where each instance ID identifies the instance being executed and can be consumed (used) by the code within the instance.

Figure 7B:
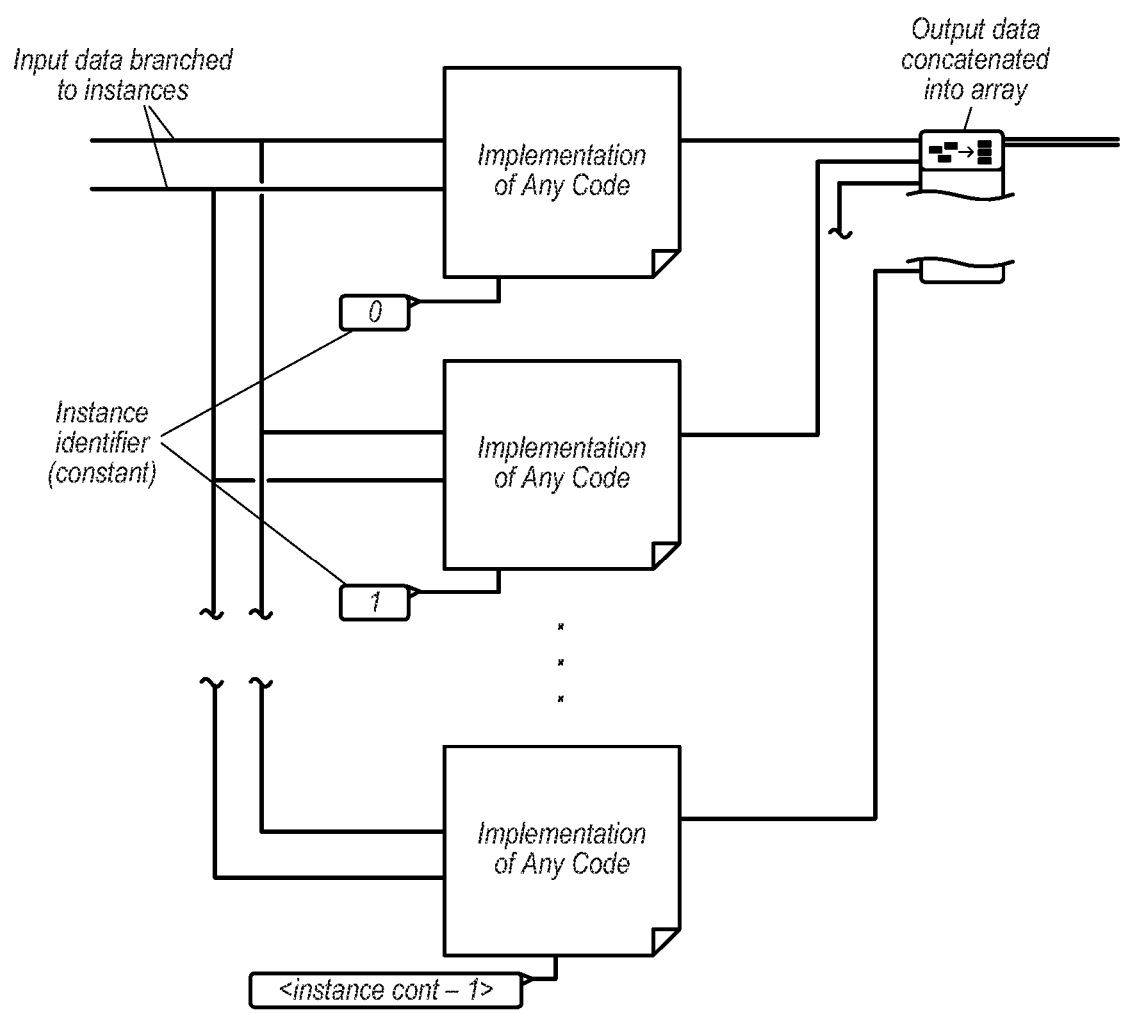
FIG. 7B illustrates an exemplary generated implementation of a graphical program corresponding to the replication structure of FIG. 7A, according to one embodiment.

FIG. 7B illustrates an exemplary generated implementation of a graphical program corresponding to the replication structure of FIG. 7A, according to one embodiment. As shown, each instance of the multiple instances has a respective instance ID, specifically, a respective value identifying that instance. In some embodiments the instance ID may be constant across all invocations of a given replica. Note that the instance variable of FIG. 7A has been transformed to a constant value in each instance that identifies that instance. As also shown, the branching tunnels of FIG. 7A have been replaced with branched input wires or lines configured to provide the scalar input data to each of the multiple instances. This particular embodiment is also configured to concatenate output data into an array, as indicated.

In various embodiments, the number of generated instances may be compile time static, i.e., may be determined at compile time, or may be runtime dynamic, i.e., may be determined dynamically at runtime, i.e., during execution.

The number of instances specified, e.g., by the user application, may differ from the number of instances generated by the compiler, runtime, or any other interpretation or execution of the application. Thus, for example, given an application specification of N instances, the compiler (or runtime process) may choose to generate M instances, where M is less or greater than N. In various embodiments, instances may be generated, cached, stored, loaded, or deleted as necessary at any stage of compilation or execution.

Thus, for example, in some embodiments, the number of instances specified may not be the same as the number of instances actually generated. For example, in one exemplary embodiment, a number N of instances to generate may be specified, where N is a positive integer, and generating multiple instances of an implementation of the first graphical program code may include generating M instances (instead of N), where M is a positive integer that is less than N. Executing the multiple instances may then include time multiplexing execution of the M instances, including managing state information, such that said time multiplexing execution of the M instances functionally implements execution of the specified N instances. In other words, one or more of the instances may be time-shared, thereby providing the functionality of a greater number of instances.

In various embodiments, generated instances may be optimized and/or de-optimized during compilation and/or execution. Performance, memory use, debugging, and/or any other application and/or system parameters, may require generation and removal of instances at any point of compilation and execution.

Generated instances may be shared among replication structures and/or other elements. In some embodiments, a first and second replication structure sharing similar characteristics may share one pool of, e.g., N, generated instances. The compiler and runtime may cooperate to properly handle any state or other side effects required by the replicated instances.

In some embodiments, the replication structure may perform fork and join of code portion executions. A replication structure may also represent mapping and reducing of data collections, e.g., running concurrently or serially.

In some embodiments, some of the generated instances may execute on different targets. For example, given generated instances 1 and 2 of a replication structure, instance 1 may be deployed and executed on one processor and replica 2 may be deployed and executed on an FPGA. These targets may include general purpose processors, co-processors, GPUs, DSPs, FPGAs, and may be within a single chip, SoC, distributed across a board, across networks, etc. More generally, in some embodiments, various of the instances may be executed/implemented on respective functional units.

Further Embodiments

The following presents further exemplary embodiments of the above techniques, although it should be noted that the embodiments described are exemplary only, and are not intended to limit the invention to any particular form, function, or appearance.

In some embodiments, the method of FIG. 5 may further include executing the graphical program, including executing the multiple instances. Note that the multiple instances may be executed in a variety of ways. For example, in one embodiment, at least two of the multiple instances may be executed concurrently. Additionally, or alternatively, at least two of the multiple instances may be executed serially.

In a further embodiment, replication structures may be nested. For example, the first graphical program code includes at least one second replication structure that specifies replication of any graphical program code inside the second replication structure.

As noted above, in some embodiments, the first graphical program code may include code that causes side effects, or that maintains state information between executions. Accordingly, in various embodiments, different communication schemes may be implemented among the instances. Thus, in some embodiments, the first replication structure may be configured to provide inter-instance communication, and at least two of the instances may be chained, i.e., communicatively connected in series.

More generally, the first replication structure may be configured to provide inter-instance communication for the instances, where the multiple instances have a connection topology including one or more of: a ring topology, a line topology, a star topology, a tree topology, a bus topology, a mesh topology, or a fully connected topology, among others. The connection topology may be determined at compile time, or at runtime.

Figure 8A:
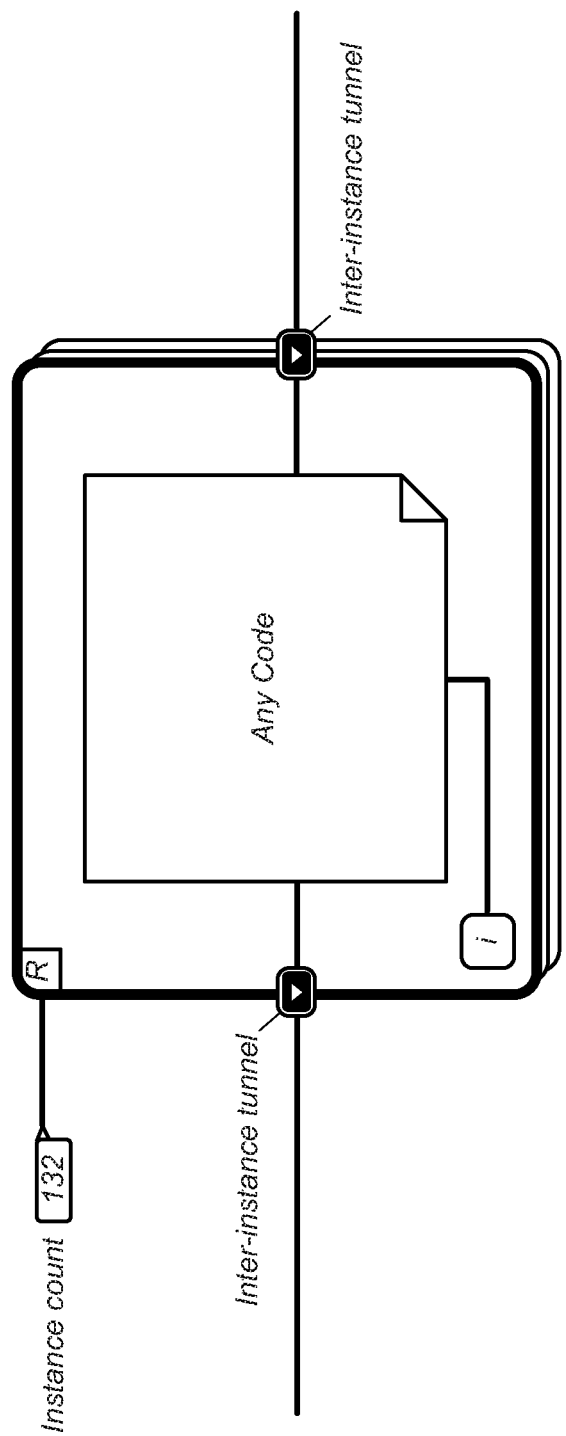
FIG. 8A illustrates an exemplary replication structure with configured for communication between adjacent instances, according to one embodiment.
Figure 8B:
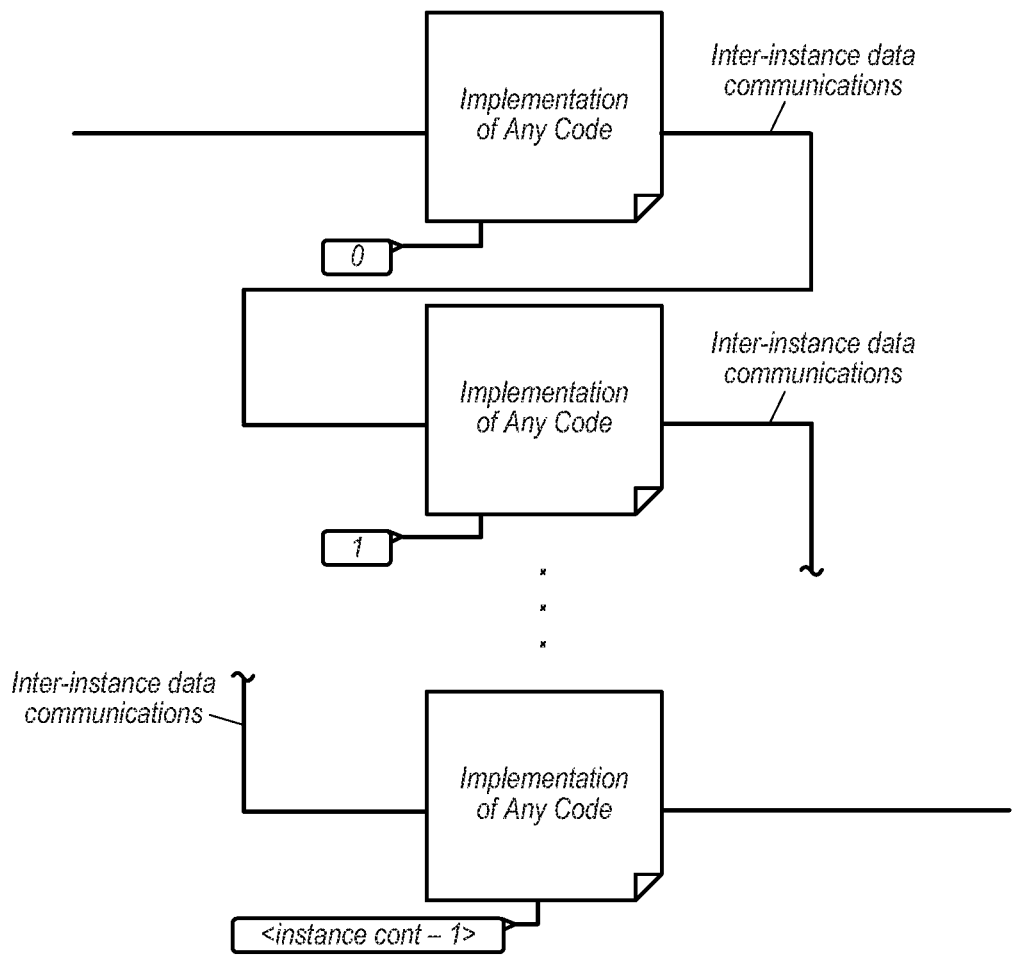
FIG. 8B illustrates an exemplary generated implementation of a graphical program corresponding to the replication structure of FIG. 8A, according to one embodiment.

FIG. 8A illustrates an exemplary replication structure configured for communication between adjacent instances (replicas), according to one embodiment. In this particular embodiment, this is accomplished via respective inter-instance tunnels for input and output of the replication structure, as indicated in FIG. 8A. FIG. 8B illustrates an exemplary generated implementation of a graphical program corresponding to the replication structure of FIG. 8A, according to one embodiment. As shown, in this exemplary implementation, multiple inter-instance data communications (paths) are generated connecting the multiple instances in series, whereby at least some of the output data of one instance may be provided to the next instance in the series. Said another way, the inter-instance tunnels may specify the passing of data between adjacent instances, e.g., where the terminals on each instance are connected so as to pass data from a given instance k to instance k+1.

Figure 9A:
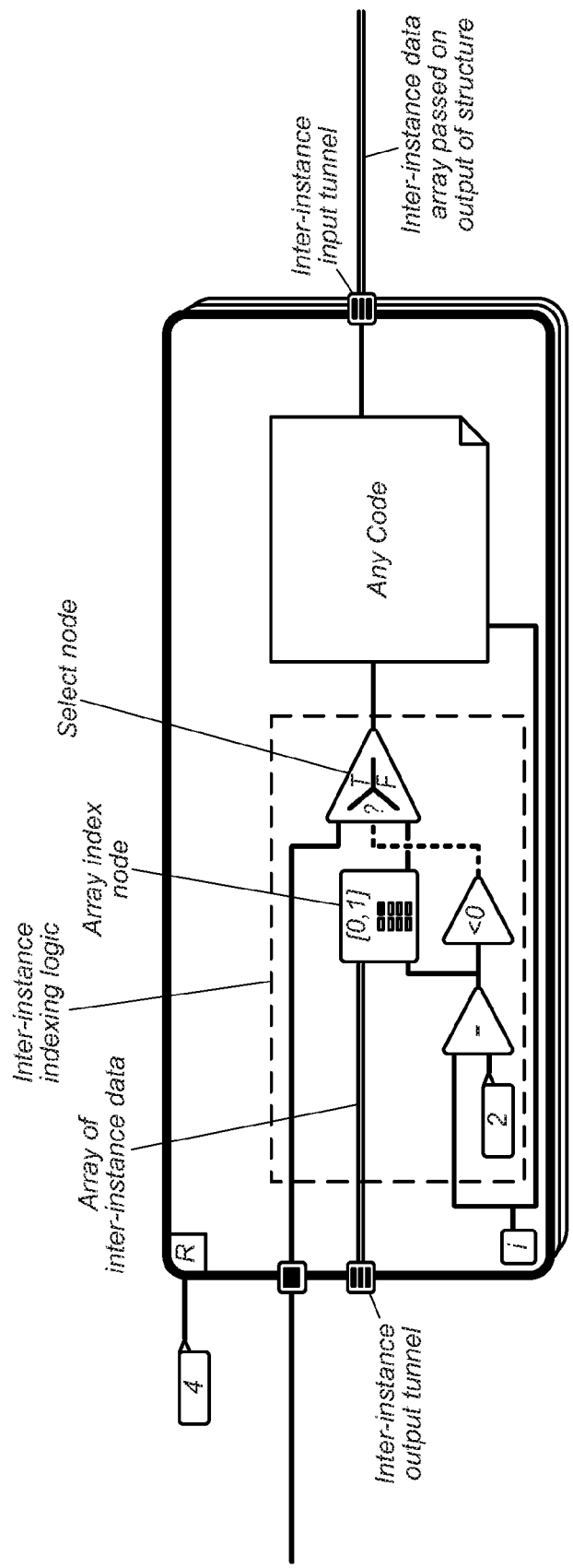
FIG. 9A illustrates an exemplary replication structure with configured for communication between arbitrary instances, according to one embodiment.

As noted above, more complex connection topologies are also contemplated. For example, FIG. 9A illustrates an exemplary replication structure configured for communication between arbitrary instances (replicas), according to one embodiment. In this exemplary embodiment, in addition to the first graphical program code ("Any Code"), the replication structure includes an inter-instance output tunnel and an inter-instance input tunnel on the left and right borders of the replication structure, respectively, specifying communication paths between arbitrary instances. In other words, the inter-instance I/O tunnels may specify the passing of data between arbitrary instances. As also shown in FIG. 9A, the replication structure also includes inter-instance indexing logic for distributing or communication such data between the instances. The exemplary logic shown operates in the following manner:

The logic uses an array index node, so labeled, to index into the array of inter-instance data using an index that is calculated by subtracting two from the instance identifier. In the instances where the calculated index is less than 0, the value returned from the index array node is ignored and a select node, so labeled, is used to select data from outside of the structure. The net effect is that instances 0 and 1 receive data from outside of the structure, while subsequent instances with identifier i receive data from the instance with identifier i–2.

Note that the inter-instance tunnel has a presence on both the input and output sides of the structure. The output side of the tunnel is similar to an auto-index output tunnel in that it establishes an array containing data from each of the instances. That array is then presented on the input side so that the instances can access those elements at random, establishing communication in any arbitrary topology. In some embodiments, the indexing logic may be implemented as actual replicated code residing in each instance that switches between elements at runtime, or, as in this example, the compiler may analyze the logic, determine that the element accessed by each instance is statically determinable, and hardwire the communication by replacing the inter-instance tunnel and indexing logic with wires routed between instances.

As FIG. 9A indicates, an array of inter-instance data is transmitted between the inter-instance indexing logic and the inter-instance output tunnel, and an inter-instance data array is pass on the output of the replication structure.

Figure 9B:
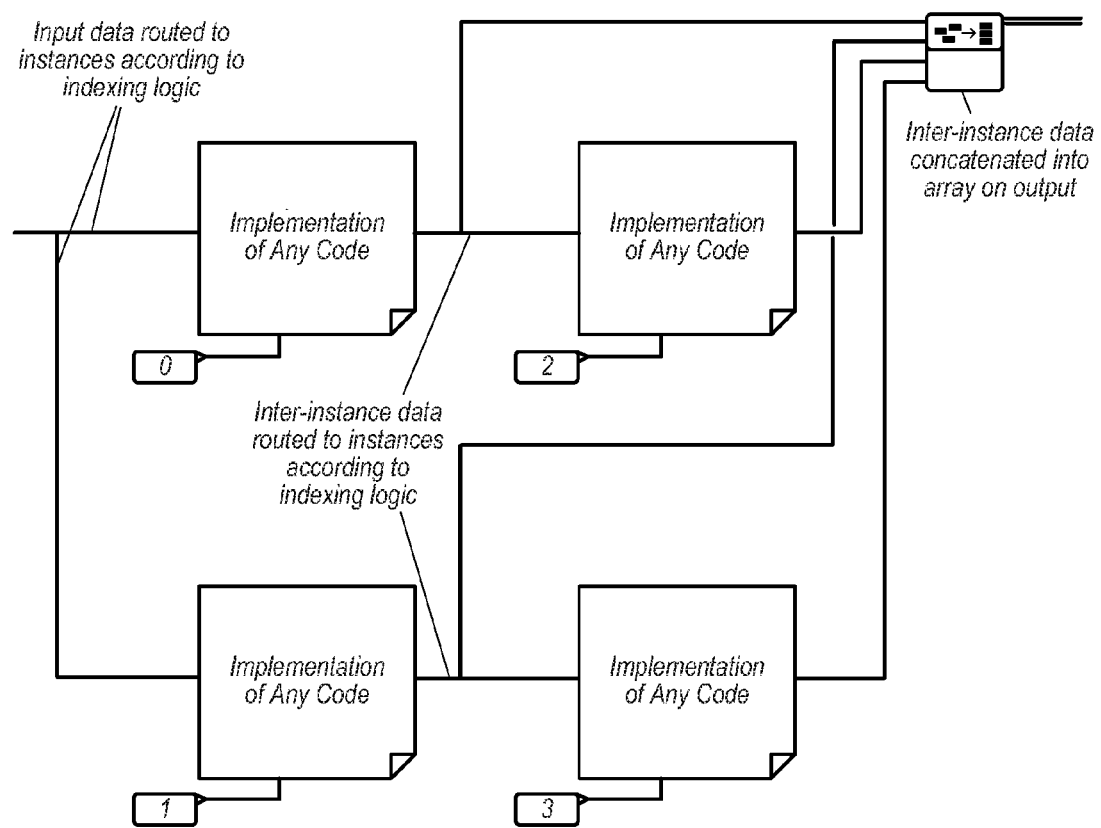
FIG. 9B illustrates an exemplary generated implementation of a graphical program corresponding to the replication structure of FIG. 9A, according to one embodiment.

FIG. 9B illustrates an exemplary generated implementation of a graphical program corresponding to the replication structure of FIG. 9A, according to one embodiment. As may be seen, in this exemplary implementation, both input data and inter-instance data are routed to instances in accordance with the indexing logic of FIG. 9A. It should be noted that the connection topology of FIG. 9B is exemplary only.

Figure 10:
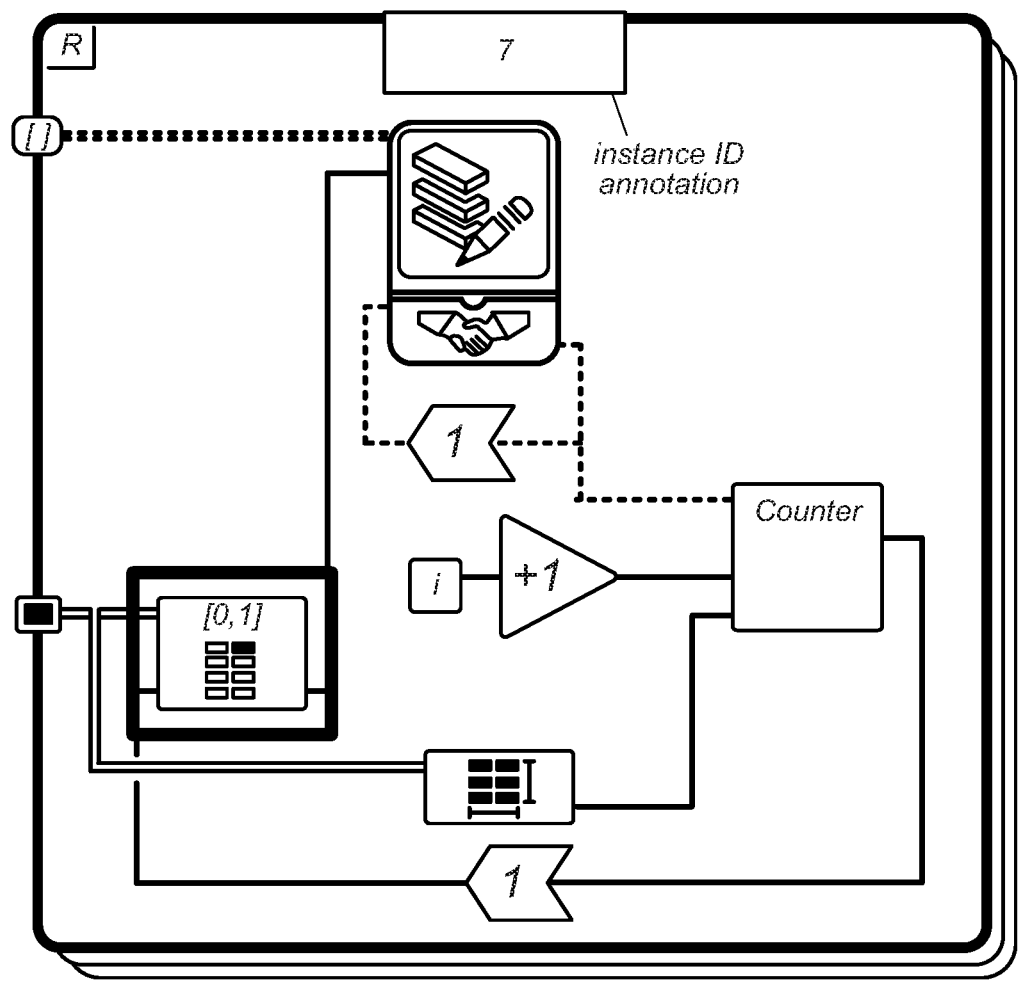
FIG. 10 illustrates an exemplary replication structure configured to provide instance identifier (ID) annotation, according to one embodiment.

In one embodiment, the first replication structure may be further configured to specify a runtime debug annotation indicating which instance is currently executing. In such embodiments, executing the graphical program may include displaying an indication of which instance is currently executing. FIG. 10 illustrates an exemplary replication structure configured to provide instance (replica) identifier (ID) annotation, according to one embodiment, where execution has been paused. Note the instance ID annotation at the top of the structure indicates instance number 7 (which may indicate the $8^{th}$ instance if zero-based counting is used).

Figure 11A:
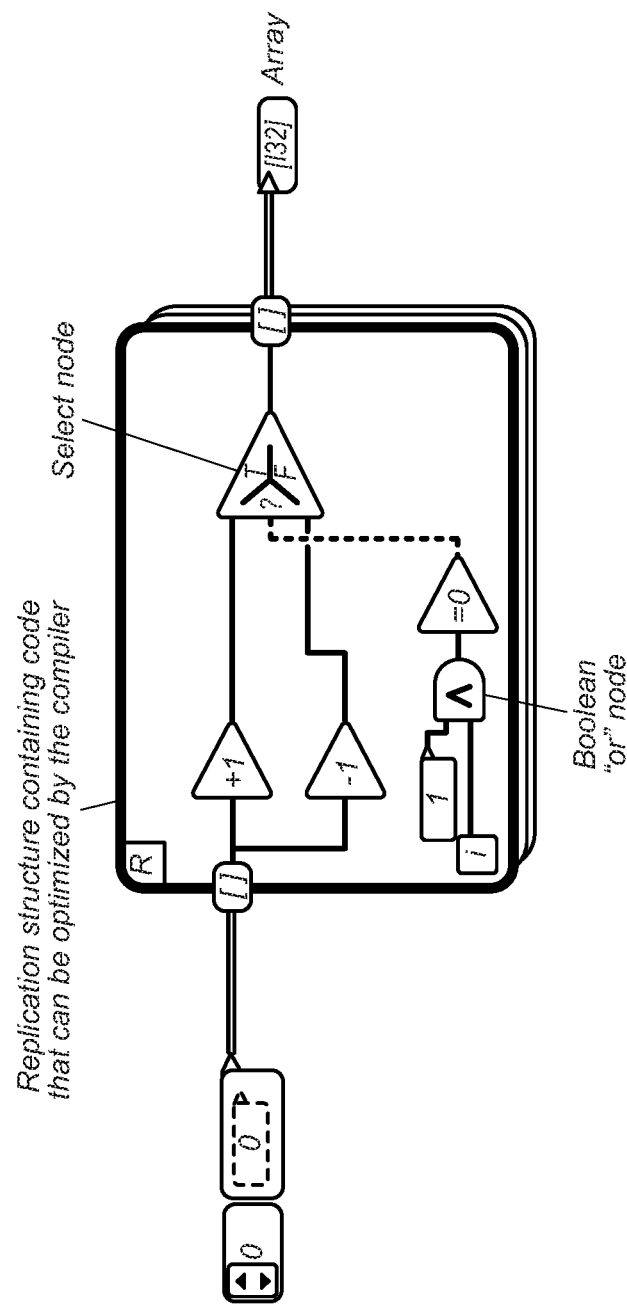
FIG. 11A illustrates an exemplary replication structure in graphical program code contained inside the structure is optimizable, according to one embodiment.

In some embodiments, users may request a visualization of the instances (replicas) generated by the compiler or runtime. For example, the request may be an adornment on the replication structure, a set of properties in a toolbar, property rail, or menu, or a part of a higher-level visualization showing instances or clones across all features capable of generating instances. FIG. 11A illustrates a replication structure in which the code contained inside the structure is optimizable depending on the instance ID, e.g., by the compiler. As shown, the included code (e.g., first graphical program code) generates a Boolean value (that is based on an "or" operation with respect to the number (ID) of the instance and a constant (1)), and provides the value to a Select node that provides output to an array accordingly.

Figure 11C:
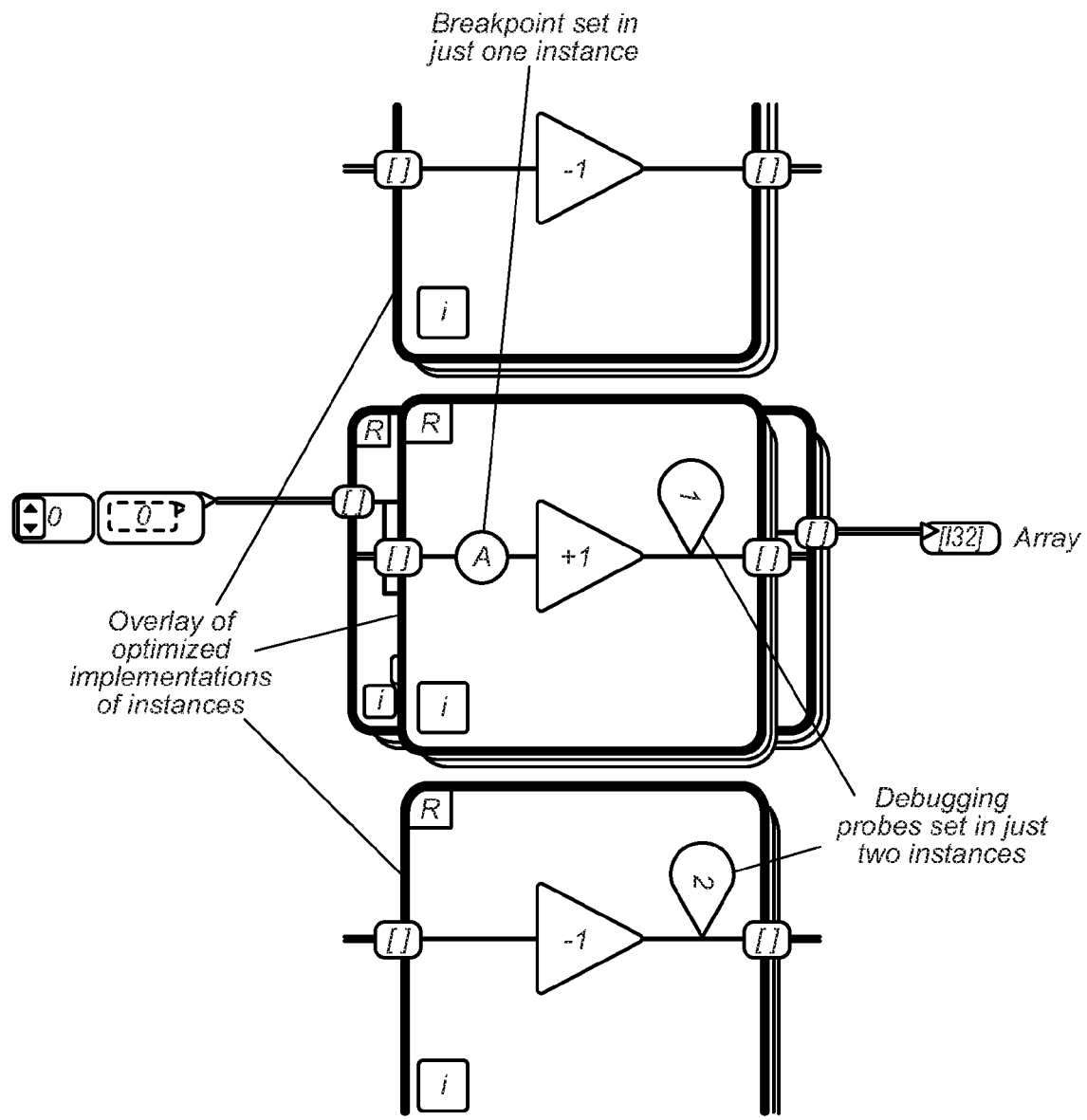
FIG. 11C illustrates an example of visualization of the optimized graphical program code of FIG. 11B, according to one embodiment.

FIG. 11B illustrates an exemplary optimized implementation of the instances, where each instance has been reduced to a single respective code element, so indicated. As shown, an array index node sends respective input data from an input array to each of the instances (respective nodes), and an aggregator node collects results from the instances and concatenates them into an array. FIG. 11C shows an example of the aforementioned visualization. In this exemplary embodiment, the visualization includes an overlay, displayed on top of the original graphical program code, which illustrates the optimized implementations of the instances. In this particular example, the visualization enables the user to set debugging probes or breakpoints in particular instances, as indicated.

This view may be shown at edit, compile, or runtime, as desired. In one embodiment, each instance may be shown in an optimized form such the user may see what the final runtime code looks like. The navigation of this view may allow viewing and interacting with generated instances across similar replication structure instances throughout the application. Users may, for example, set breakpoints, probe values, view analysis such as timing, resource, and/or other estimates or profiled values, etc., on multiple generated instances at once. The data may be filtered through a manual or automated selection process.

General Creation of a Graphical Program

The following describes creation of graphical programs in general, according to some embodiment.

A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW™ graphical programming development environment to create the graphical program.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In some embodiments, a graphical user interface or front panel for the graphical program may be created, e.g., in response to user input. The graphical user interface may be created in any of various ways, e.g., depending on the graphical programming development environment used.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

The graphical program may be executed on any kind of computer system(s) or reconfigurable hardware, as described above.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable by a functional unit to implement:
   including a replication structure in a graphical program, wherein the including comprises displaying a replication structure icon in the graphical program displayed on a display, wherein the replication structure icon comprises an interior portion, wherein the replication structure specifies replication of any graphical program code inside the interior portion of the replication structure icon:
   including graphical program code inside the interior portion of the replication structure icon:
   automatically generating an implementation of the graphical program, including:
      generating multiple instances of an implementation of the graphical program code within the implementation of the graphical program, wherein said generating is performed in response to including the graphical program code inside the interior portion of the replication structure icon:
   wherein the multiple instances of an implementation of the graphical program code are executed during execution of the implementation of the graphical program.

2. The non-transitory computer accessible memory medium of claim 1, wherein at least two of the multiple instances are executed concurrently.

3. The non-transitory computer accessible memory medium of claim 1, wherein at least two of the multiple instances are executed serially.

4. The non-transitory computer accessible memory medium of claim 1,
   wherein said generating an implementation of the graphical program comprises compiling the graphical program; and
   where said generating multiple instances is performed during said compiling.

5. The non-transitory computer accessible memory medium of claim 1,
   wherein said generating an implementation of the graphical program comprises generating an intermediate representation of the graphical program; and
   where said generating multiple instances is performed during said generating the intermediate representation.

6. The non-transitory computer accessible memory medium of claim 1, wherein said generating multiple instances is performed at runtime.

7. The non-transitory computer accessible memory medium of claim 1, wherein the graphical program code includes at least one second replication structure that specifies replication of any graphical program code inside the second replication structure.

8. The non-transitory computer accessible memory medium of claim 1, wherein the graphical program code includes one or more of:
   code that causes side effects; or
   code that maintains state information between executions.

9. The non-transitory computer accessible memory medium of claim 1, wherein the implementation of the graphical program code includes one or more of:
   original graphical source code;
   an intermediate representation; or
   executable code.

10. The non-transitory computer accessible memory medium of claim 1, wherein the replication structure is configured to receive at least one collection as input, and wherein the number of generated instances is determined based on the size of the at least one collection.

11. The non-transitory computer accessible memory medium of claim 10, wherein the replication structure is configured to implicitly disaggregate collection inputs into scalars and distribute the scalars to respective instances of the multiple instances.

12. The non-transitory computer accessible memory medium of claim 1, wherein the replication structure is configured to implicitly aggregate scalar outputs into collections.

13. The non-transitory computer accessible memory medium of claim 1, wherein the replication structure is configured to:
   receive at least one variable as input; and
   distribute the at least one variable to each of the instances.

14. The non-transitory computer accessible memory medium of claim 1, wherein the replication structure comprises an instance count terminal configured to receive an input value, and wherein the number of generated instances is determined based on the input value.

15. The non-transitory computer accessible memory medium of claim 1, wherein the number of generated instances is compile time static.

16. The non-transitory computer accessible memory medium of claim 1, wherein the number of generated instances is runtime dynamic.

17. The non-transitory computer accessible memory medium of claim 1, wherein the replication structure comprises an instance identifier variable, wherein the instance identifier variable is usable by each implementation of the graphical program code to identify its respective instance.

18. The non-transitory computer accessible memory medium of claim 1, wherein the replication structure is configured to provide inter-instance communication, and wherein at least two of the instances are chained.

19. The non-transitory computer accessible memory medium of claim 1, wherein the replication structure is configured to provide inter-instance communication for the instances, wherein the multiple instances have a connection topology comprising one or more of:
   a ring topology;
   a line topology;
   a star topology;
   a tree topology;
   a bus topology;
   a mesh topology; or
   a fully connected topology.

20. The non-transitory computer accessible memory medium of claim 19, wherein the connection topology is determined at compile time.

21. The non-transitory computer accessible memory medium of claim 19, wherein the connection topology is determined at runtime.

22. The non-transitory computer accessible memory medium of claim 1, wherein the replication structure is further configured to specify a runtime debug annotation indicating which instance is currently executing, and wherein said executing the graphical program comprises:
   displaying an indication of which instance is currently executing.

23. The non-transitory computer accessible memory medium of claim 1, wherein the program instructions are further executable to perform: specifying a number N of instances to generate, wherein N is a positive integer; wherein said generating multiple instances of an implementation of the first graphical program code comprises generating M instances, wherein M is a positive integer that is less than N; and wherein said executing the multiple instances comprises: time multiplexing execution of the M instances, including managing state information, wherein, said time multiplexing execution of the M instances functionally implements execution of the specified N instances.

24. The non-transitory computer accessible memory medium of claim 1, wherein the program instructions are further executable to perform:
   specifying a number N of instances to generate, wherein N is a positive integer;
   wherein said generating multiple instances of an implementation of the graphical program code comprises generating M instances, wherein M is a positive integer that is different from N; and
   wherein said executing the multiple instances comprises:
      executing the M instances, including managing state information, such that said executing the M instances functionally implements execution of the specified N instances.

25. A computer-implemented method for creating a graphical program, the method comprising:
   utilizing a computer to implement:
      including a replication structure in a graphical program, wherein the including comprises displaying a replication structure icon in the graphical program displayed on a display, wherein the replication structure icon comprises an interior portion, wherein the replication structure specifies replication of any graphical program code inside the interior portion of the replication structure icon:
      including graphical program code inside the interior portion of the replication structure icon;
      automatically generating an implementation of the graphical program,
   including: generating multiple instances of an implementation of the graphical program code within the implementation of the graphical program, wherein said generating is performed in response to including the graphical program code inside the interior portion of the replication structure icon:
   wherein the multiple instances of an implementation of the graphical program code are executed during execution of the implementation of the graphical program.

* * * * *